United States Patent
Mateman

(10) Patent No.: US 9,518,473 B2
(45) Date of Patent: Dec. 13, 2016

(54) SHAFT SEAL INSERT

(75) Inventor: Gesinus Mateman, Hengelo (NL)

(73) Assignee: SIEMENS AKTIENGESELLSCHAFT, München (DE)

( * ) Notice: Subject to any disclaimer, the term of this patent is extended or adjusted under 35 U.S.C. 154(b) by 550 days.

(21) Appl. No.: 14/110,198

(22) PCT Filed: Mar. 26, 2012

(86) PCT No.: PCT/EP2012/055273
§ 371 (c)(1),
(2), (4) Date: Oct. 7, 2013

(87) PCT Pub. No.: WO2012/136496
PCT Pub. Date: Oct. 11, 2012

(65) Prior Publication Data
US 2014/0030063 A1    Jan. 30, 2014

(30) Foreign Application Priority Data
Apr. 8, 2011 (DE) .......... 10 2011 007 071

(51) Int. Cl.
F04D 29/10 (2006.01)
F01D 11/02 (2006.01)
(Continued)

(52) U.S. Cl.
CPC ............ F01D 11/02 (2013.01); F01D 11/003 (2013.01); F04D 29/124 (2013.01); F16J 15/002 (2013.01);
(Continued)

(58) Field of Classification Search
CPC ...... F01D 11/02; F01D 11/003; F04D 29/124; F16J 15/002; F16J 15/40; F16J 15/447
See application file for complete search history.

(56) References Cited

U.S. PATENT DOCUMENTS 5,066,026 A * 11/1991 Heck ............... F16J 15/3484
277/400
5,412,977 A * 5/1995 Schmohl ............ F01D 11/06
277/318
(Continued)

FOREIGN PATENT DOCUMENTS

DE      4225642 C1    7/1993
DE  102009012038 A1   9/2010
(Continued)

OTHER PUBLICATIONS

Atlas Copco; "Turbokompressor"; Dokumentation der Bestelldetails OV1c; Ausschnitt aus der Darstellung OV1b; Zeichnung OV1 a; Zeichnung OV1 b;; 2008.
(Continued)

*Primary Examiner* — Ninh H Nguyen

(57) ABSTRACT

A shaft seal insert for the shaft seal of a turbomachine extending along a rotational axis includes:—a rotor part attachable on a shaft of a rotor,—a stator part insertable into a stator receiving area, and—a dry gas seal having a rotating seal element attached to the rotor part and a fixed seal element attached to the stator part to seal an intermediate space between the two seal elements, which lie opposite each other on a sealing surface extending radially and in the circumferential direction. A labyrinth seal is provided on a high-pressure side in a serial arrangement with the dry gas seal to seal the intermediate space, having a fixed and rotating labyrinth seal parts. The fixed labyrinth seal part is part of the stator part or is fixed thereto. The rotating labyrinth seal part is part of the rotor part or is fixed thereto.

5 Claims, 2 Drawing Sheets

(51) Int. Cl.
  *F01D 11/00*   (2006.01)
  *F16J 15/447*  (2006.01)
  *F16J 15/00*   (2006.01)
  *F16J 15/34*   (2006.01)
  *F16J 15/40*   (2006.01)
  *F16J 15/44*   (2006.01)
  *F04D 29/12*   (2006.01)

(52) U.S. Cl.
  CPC ............ *F16J 15/3464* (2013.01); *F16J 15/40* (2013.01); *F16J 15/44* (2013.01); *F16J 15/447* (2013.01)

(56) References Cited

U.S. PATENT DOCUMENTS

| | | | |
|---|---|---|---|
| 5,718,560 A * | 2/1998 | Lorenzen | F16J 15/3404 277/361 |
| 6,109,617 A | 8/2000 | Laney | |
| 6,325,382 B1 | 12/2001 | Iwamoto et al. | |
| 8,651,801 B2 * | 2/2014 | Shamseldin | F04D 29/124 277/317 |

FOREIGN PATENT DOCUMENTS

| | | |
|---|---|---|
| EP | 0781948 A1 | 7/1997 |
| EP | 1995465 A1 | 11/2008 |
| EP | 1207310 B1 | 4/2011 |
| JP | 2004308754 A | 11/2004 |
| RU | 2004867 C1 | 12/1993 |
| WO | WO 9219869 A1 | 11/1992 |
| WO | WO 2008046793 A1 | 4/2008 |

OTHER PUBLICATIONS

Flowserve; "Turbomachinery Sealing Solutions"—Broschüre; "Wellendichtung"—grafische Darstellung; "Gaspac"—Ausdruck website; pp. 1-30;; 2007.

* cited by examiner

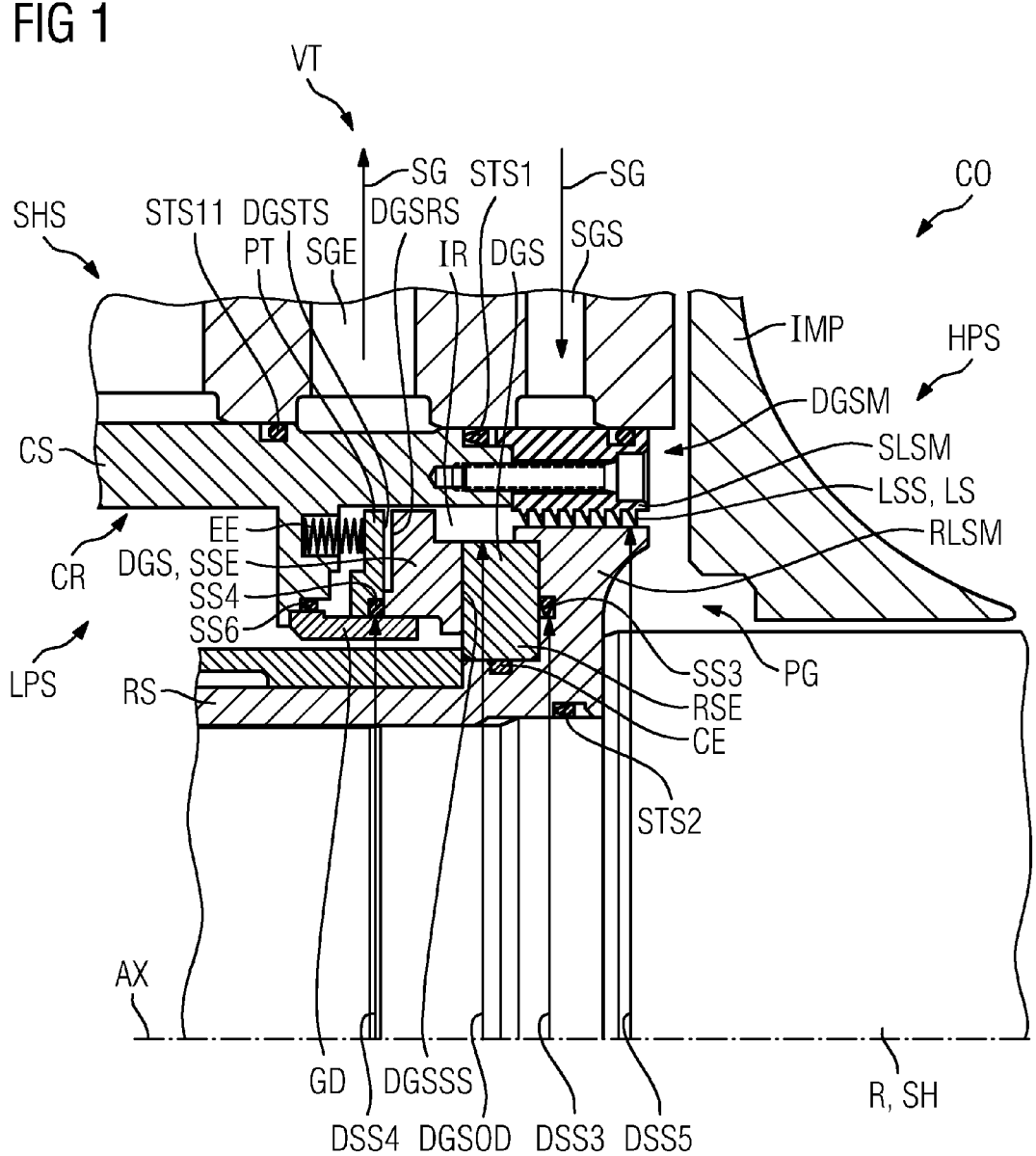

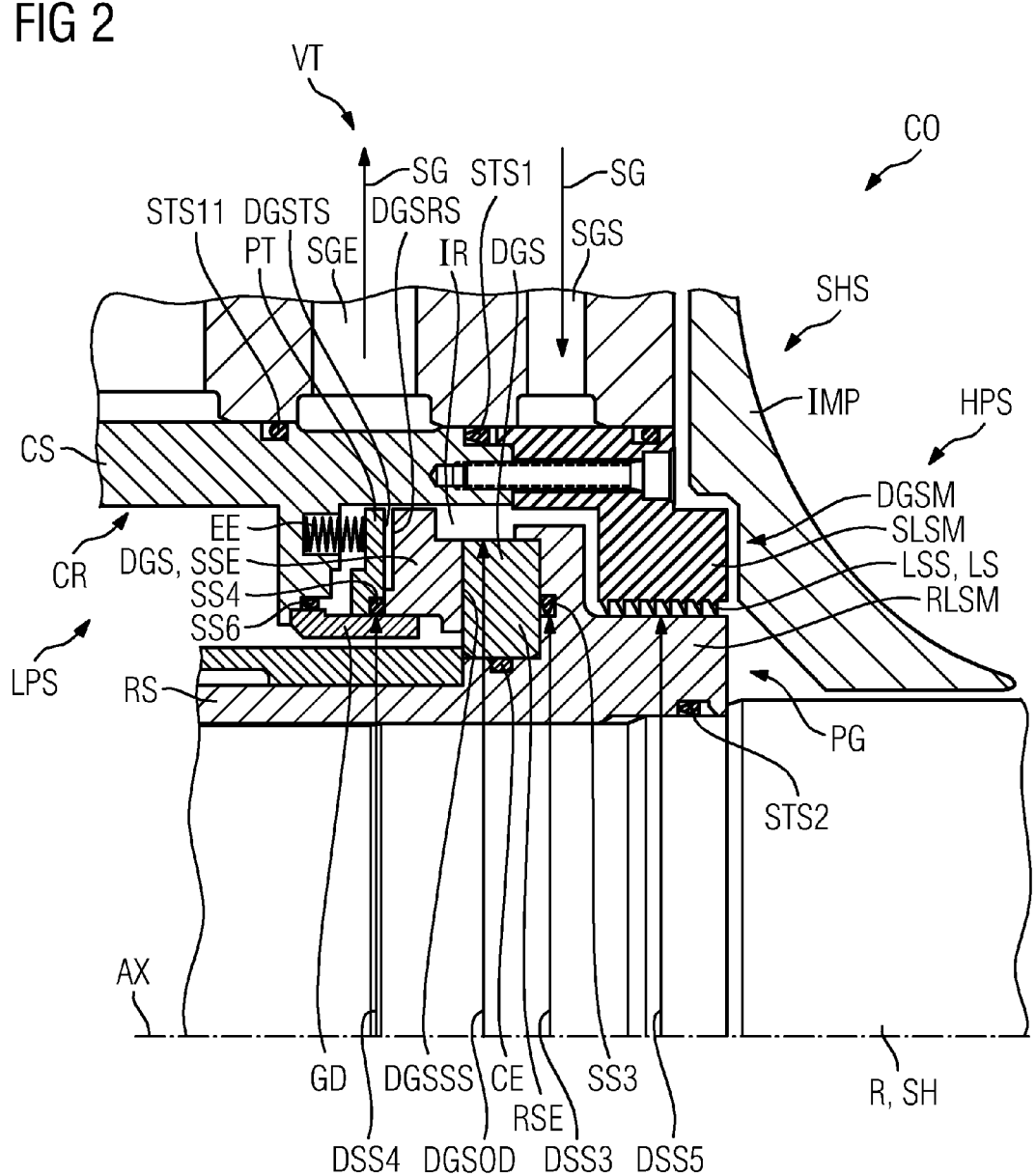

SHAFT SEAL INSERT

CROSS REFERENCE TO RELATED APPLICATIONS

This application is the US National Stage of International Application No. PCT/EP2012/055273, filed Mar. 26, 2012 and claims the benefit thereof. The International Application claims the benefits of German application No. 102011007071.0 DE filed Apr. 8, 2011. All of the applications are incorporated by reference herein in their entirety.

FIELD OF INVENTION

The invention relates to a shaft seal insert for a shaft seal of a turbomachine, which extends in an axial direction along an axis of rotation, comprising
- a rotor part which is configured such that it can be mounted on a shaft of a rotor which extends along the axis of rotation,
- a stator part which is configured such that it can be inserted into a stator recess,
- at least one dry gas seal having a rotating sealing element mounted on the rotor part and one static sealing element mounted on the stator part in order to seal an intermediate space between the rotating sealing element and the static sealing element, wherein the static sealing element and the rotating sealing element are arranged facing each other on a sealing surface which extends radially and in the circumferential direction, wherein the shaft seal insert has a high-pressure side at one axial end and a low-pressure side at the other axial end.

BACKGROUND OF INVENTION

Dry gas seals are increasingly popular as shaft seals in turbomachines, for example in turbocompressors. Dry gas seals in the sense of the present invention are shaft seals which have at least two sealing elements extending around the shaft in the circumferential direction (with respect to the axis of rotation) and comprising in each case at least one sealing surface which faces the opposite sealing element, by means of which the dry gas seal seals the intermediate space between a static part, for example a housing, and the rotating part, in particular a shaft. One of the sealing elements rotates with the rotating part and the other sealing element is stationary with respect to the housing. At least one of the sealing surfaces which face each other has projections and/or recesses which act together with a sealing gas to establish a gas film between the two sealing elements on the sealing surfaces, such that the dry gas seal operates, during the intended rotation, without contact between the rotating sealing element and the static sealing element. The dry gas seal requires a clean sealing gas having substantially no liquid components, in order to seal in a damage-free and/or contactless fashion. The recesses and/or projections can have various shapes and are preferably provided on only one sealing surface, preferably on the sealing surface of the rotating sealing element. Recesses can be configured with a U shape, a firtree shape, a T shape or in the shape of a spiral, such that a stable sealing film of the sealing gas is formed between the two sealing surfaces. Decisive advantages result from the use of dry gas seals, for example in compressors, such that the leakage is comparatively small and no lubricating oil is necessary, such as for example in the case of seals working with liquids or in comparison with a labyrinth seal. A sealing gas is regularly applied to a high-pressure side of dry gas seals, wherein a small leakage of this sealing gas passes through the dry gas seal from the high-pressure side to a side of lower pressure—a low-pressure side—where this leakage is generally evacuated into what is termed a vent line. In order also to reduce the consumption of the specially prepared sealing gas, the dry gas seal is generally surrounded by other shaft seals; in particular a labyrinth seal, which on the high-pressure side reduces the outflow of the sealing gas to the side which faces away from the dry gas seal, is generally located on the high-pressure side. The main reason for the serial additional seal, in particular a labyrinth seal, is the sealing effect in the event of the dry gas seal failing. Even those dry gas seals which have a sealing gas supply line as a central supply line of the sealing surfaces are generally protected from contamination by means of a serial additional seal, in particular a labyrinth seal. A process gas, which in the case of a turbocompressor is at an operating pressure, is usually present on the high-pressure side of the dry gas seal. The sealing gas must be at an overpressure with respect to this process gas in order to keep the process gas—which may be contaminated—away from the delicate dry gas seal.

An arrangement having a dry gas seal and a labyrinth seal is already known from, in each case, DE 10 2009 012 038 A1, DE 42 25 642 C1 and EP 0 781 948 A1, but the assembly complexity of these is higher due to the modular separation of the labyrinth seal from the dry gas seal. The fabrication and assembly of these two modules requires increased precision because modern machinery efficiency requirements require tight radial play of the labyrinth seal and precise arrangement of the dry gas seal.

SUMMARY OF INVENTION

Proceeding from the described prior art, the invention addresses the problem of reducing the complexity of a turbomachine having a shaft seal insert of the type described in the introduction, of simplifying the assembly of such a turbomachine, and of reducing the space requirement of the shaft seal insert.

The invention offers a solution to this problem in the form of a shaft seal insert of the type defined in the introduction, having the additional features as recited in the independent claim(s). The dependent claims contain advantageous developments of the invention.

In the vocabulary of the invention, the axis of rotation is a central axis of the shaft seal insert which is termed axis of rotation because the dry gas seal of the shaft seal insert is a shaft seal which naturally surrounds a shaft which rotates in operation. All other terms which relate without further explanation to the vocabulary of circular motion—for example axial, radial, circumferential direction, diameter—relate to the axis of rotation as the center of a circular motion.

The vocabulary moreover differentiates between two fundamentally different seal types, specifically the shaft seal, which seals two components which are in relative motion with respect to each other, and the static seal, which seals two components which are stationary with respect to each other.

With respect to the shaft seal according to the invention, the terms high-pressure side and low-pressure side are used, which indicates that, in the presence of a pressure difference, the shaft seal prevents a flow of a fluid from a higher pressure side to a lower pressure side, thus maintaining the pressure difference.

The stator part which has already been mentioned in the introduction is to be understood as a stationary component which bears components at least of the dry gas seal of the shaft seal insert. The stator part is configured such that it can be inserted into a recess of a stator, wherein the stator is preferably configured as a housing of the turbomachine. In this context, it can also relate to components which are connected to the housing, such that an indirect connection between the stator part and a housing of a turbomachine is provided. In any case, the stator part is suitable for combining the components of the shaft seal insert into one unit, such that the shaft seal insert is a module which is movable in itself and which, during assembly, can be mounted as a whole on the shaft of a rotor. The shaft seal insert of the invention is preferably first mounted on the shaft and then placed, together with the shaft, for example into a barrel-type housing or a lower housing half, and attached in the housing.

The configuration according to the invention of the static labyrinth seal part and of the rotating labyrinth seal part as parts of the stator part and, respectively, of the rotor part is to be understood as also encompassing an at least partially one-piece configuration of these two components. Mounting the labyrinth seal parts securely to the sleeves, in accordance with the invention, is understood to mean a releasable attachment which, in particular, can be provided as an alternative to the at least partially one-piece configuration.

Particular advantages result from the shaft seal insert according to the invention on account of the reduction in complexity as a result of reducing the number of parts in a turbomachine, since the labyrinth seal which is adjacent to the dry gas seal of the shaft seal insert is now part of the shaft seal insert.

The invention is particularly advantageous for the assembly of a barrel-type compressor because in this case the seals are inserted together with the shaft into the housing.

The advantage of this simplification is significant also in the context of the assembly, since the complex steps of aligning a rotor with respect to the shaft seal insert and the labyrinth seal insert, which is conventionally arranged separate from the latter, are greatly simplified or even become unnecessary. The prior art required difficult and time-consuming alignments, in particular of the rotor, dry gas seal, labyrinth seal and/or housing components with respect to each other, to be carried out. On account of the combination of the labyrinth seal with the dry gas seal in the shaft seal insert of the invention, it is moreover possible, in accordance with the invention, to reduce the installation space of a shaft seal of a turbomachine, in particular because the labyrinth seal no longer requires its own attachment on the housing; instead, the labyrinth seal is attached directly, with the shaft seal insert, to the housing. This saving in installation space leads, in particular, to a reduced axial installation space requirement, thus making possible a reduction in the required length of the shaft of the rotor, resulting in decisive advantages in terms of rotor dynamics, in particular oscillation amplitudes are smaller and any resonant frequencies are advantageously higher as a consequence of the increase in stiffness. For otherwise identical operational parameters of a turbomachine, this allows the shaft diameter to be reduced such that, if the radial play requirement is assumed to be identical, a smaller area is to be sealed by the shaft seal, meaning that there is only a smaller potential leakage volume and the efficiency of the turbomachine is increased.

It is expedient for the labyrinth seal to be arranged as the axially outermost shaft seal on the high-pressure side, thus ensuring that no contaminants from the high-pressure side can pass unhindered to the dry gas seal of the shaft seal insert. Expediently, the shaft seal insert on the stator part is provided with a second static seal, such that the stator part can be inserted in a sealing manner into a recess in the stator. Furthermore, the rotor part is expediently provided with a static seal such that the rotor part can be mounted in a sealing manner onto the shaft of a rotor. The shaft of the rotor can advantageously be provided with a shoulder at which the rotor part comes into axial abutment with a contact surface. The static seals between the shaft and the rotor part or, respectively, between the stator recess and the stator part are preferably seals having a V-shaped cross section which, when acted upon by a pressure difference, opens so as to support the sealing action. This seal type is termed a PTFE cup seal and exhibits good resistance properties, even to pressure surges. Other seals can also be used, for example elastomeric O-rings.

The invention not only relates to a shaft seal insert but also to a turbomachine comprising the shaft seal insert, at least one housing and a rotor having a shaft or an arrangement of a shaft seal insert of the type according to the invention having a rotor comprising a shaft and a stator which at least partly surrounds the rotor.

In a particularly compact development of the dry gas seal according to the invention, a sealing surface, which extends in the circumferential direction and in the axial direction, is arranged coaxially with the axis of rotation at a fifth diameter between the static labyrinth seal part and the rotating labyrinth seal part, wherein the outermost diameter of the sealing surfaces of the dry gas seal is smaller than the fifth diameter.

A development of this type is preferably used in turbomachines, the geometry and operational parameters of which produce in other circumstances, in the event of a failure of the dry gas seal, a change of the thrust on the rotor which is still acceptable for the axial bearing.

As an alternative to the previously explained advantageous development, it is expedient if the sealing surface, which extends in the circumferential direction and in the axial direction, between the static labyrinth seal part and the rotating labyrinth seal part is arranged coaxially with the axis of rotation at the fifth diameter, is substantially identical to a fourth diameter, at which a fourth static seal is located between the stator part and the static sealing element of the dry gas seal. The difference between the fourth diameter and the fifth diameter is preferably less than 10% of the fifth diameter. In this manner, in the event of a defect in the dry gas seal of the shaft seal insert of the invention, only a relatively small change in the thrust on a shaft of a turbomachine occurs since the diameters at which the various pressures, which differ by virtue of the pressure difference over the dry gas seal, act on the rotor in the event of a pressure breakdown over the dry gas seal itself do not differ, to the case that the pressure difference is broken down over the connected labyrinth seal. In particular in the case of a compressor, having an intended mode of operation in which the dry gas seal breaks down a pressure difference of in particular 200 bar, in the normal operating state an axial bearing is generally not capable of withstanding the change in thrust if the dry gas seal is defective and a change in the shaft thrust results therefrom, if the previously defined criterion with respect to the diameters is not fulfilled.

In order that the sealing elements of the dry gas seal of the shaft seal insert do not experience any unnecessarily high loads which ensure the necessary geometry for establishing the lubricating film which produces the contactlessness, it is expedient for a second static seal to be arranged between the rotor part and the static sealing element at a third diameter and for the third diameter to differ from the fourth diameter by no more than 10% of the fourth diameter.

An advantageous development of the invention expediently has a supply line for supplying a sealing gas to the axial intermediate space between the labyrinth seal and the dry gas seal of the shaft seal insert, in order that the labyrinth seal reduce the amount of prepared and pure sealing gas leaving in the direction of the high-pressure side and in order that the dry gas seal be acted upon only by the pure sealing gas. The sealing gas is, for this purpose, expediently at an overpressure with respect to a process gas on the other side of the labyrinth seal on the high-pressure side, such that no portion of the process gas can reach the dry gas seal. A seal outflow line, which supplies the pure sealing gas, optionally as a mixture with another gas which is present on the low-pressure side, to a sealing gas preparation or to a flare stack, is expediently provided on the low-pressure side of the dry gas seal.

BRIEF DESCRIPTION OF THE DRAWINGS

In the following, the invention is explained in more detail by way of exemplary embodiments with reference to drawings, wherein embodiment possibilities of the invention which differ from the exemplary embodiments present themselves to a person skilled in the art especially by the claims being combined in any way desired. In the drawings:

FIG. 1 shows, in longitudinal section, a shaft seal insert according to the invention, preferably for pressure differences of less than 200 bar, and FIG. 2 shows, in longitudinal section, a shaft seal insert according to the invention, preferably for pressure differences of greater than 200 bar.

DETAILED DESCRIPTION OF INVENTION

In the following description, identical components, or components with identical functions, are provided with the same reference sign. Expressions such as axial, radial, circumferential direction, diameter and radius relate to an axis of rotation AX, which is a central axis of a shaft seal insert DGSM according to the invention. The shaft seal insert DGSM illustrated in FIGS. 1 and 2 comprises a stator part CS, a rotor part RS, a dry gas seal DGS and a labyrinth seal LS. The rotor part RS of the shaft seal insert DGSM is mounted in a sealing manner on a shaft SH of a rotor R by means of a second static seal STS2. The shaft SH also bears at least one rotor wheel of a turbomachine CO which, in a manner not illustrated in more detail, is configured as a centrifugal compressor.

The stator part CS is inserted in a sealing manner into a stator recess CR by means of a first static seal STS1. The first static seal STS1 and the second static seal STS2 have a V-shaped profile arranged in a respective circumferential sealing groove such that the V-shaped profile opens when pressure from a high-pressure side HPS acts upon the static seal. The shaft seal insert DGSM has a high-pressure side HPS and a low-pressure side LPS, wherein the high-pressure side HPS is exposed to a process gas which is at an overpressure with respect to the low-pressure side LPS. The stator part is in addition sealed with respect to the stator recess CR by means of a static seal STS11. The shaft seal insert DGSM is, in FIGS. 1 and 2, part of a shaft seal SHS which is not illustrated in its entirety.

An intermediate space IR between the stator part CS and the rotor part RS is sealed by means of the dry gas seal DGS on one side and, in serial arrangement therewith, by means of the labyrinth seal LS on the other side. The dry gas seal DGS here serves to break down the pressure difference between the high-pressure side HPS and the low-pressure side LPS. A sealing gas supply line SGS for a particularly pure sealing gas SG is provided between the dry gas seal DGS and the labyrinth seal LS. The purpose of the labyrinth seal LS is in this case to reduce the quantity of sealing gas SG leaving in the direction of the high-pressure side or, as the case may be, into the potentially contaminated and aggressive process gas PG. For this reason, the dry gas seal DGS is exposed on its high-pressure side only to the clean and dry sealing gas SG, which is at an overpressure with respect to the process gas PG. A sealing outflow line SGE, which preferably opens into a vent or a flare stack, is provided on the low-pressure side LPS of the dry gas seal DGS for the only small leakage of the dry gas seal DGS.

The dry gas seal DGS has a rotating sealing element RSE and a static sealing element SSE which face each other, with a respective sealing surface, at a common dry gas seal sealing surface DGSSS. The rotating sealing element RSE is sealed with respect to the rotor part RS, with respect to the pressure difference, by means of a third static seal SS3, which extends in the circumferential direction at a third diameter DSS3. The stator part CS has an elastic element EE, which prestresses the static sealing element SSE against the rotating sealing element RSE by means of a piston PT. The static sealing element SSE is sealed against the pressure difference with respect to the guide ring GD by means of a fourth static seal SS4 at a fourth diameter DSS4. In the vocabulary of the invention, the elastic element EE and the piston PT, as well as a guide GD, are part of the stator part CS.

The labyrinth seal LS has a static labyrinth seal part SLSM and a rotating labyrinth seal part RLSM, which stand on opposite sides from one another of a middle labyrinth sealing surface LSS extending in the axial and circumferential directions, wherein the labyrinth sealing surface LSS extends in the circumferential direction at a fifth diameter DSS5.

The middle labyrinth sealing surface is to be understood as a surface which extends in the axial and circumferential directions along the fifth diameter DSS5, wherein the fifth diameter is the product of a circular surface-weighted average of the outer diameter on the high-pressure side, the inner diameter on the high-pressure side, the outer diameter on the low-pressure side and the inner diameter on the low-pressure side, of the opening of the labyrinth seal LS.

The rotating sealing element RSE stands opposite the static sealing element SSE at the dry gas seal sealing surface DGSSS with a rotating sealing surface DGSRS, which is provided with projections and recesses which are preferably wedge-shaped and/or spiral shaped. The static sealing element SSE has a specially configured surface on a static sealing surface DGSTS, which is oriented toward the dry gas seal sealing surface DGSSS. The configuration of the surface matches the opposite rotating sealing surface DGSRS such as to ensure contactless operation of the dry gas seal DGS, while establishing a corresponding lubrication film of the sealing gas SG.

FIG. 1 shows a particularly compact configuration of the shaft seal insert DGSM in which the fifth diameter DSS5 is greater than an outermost outer diameter of the sealing surfaces DGSOD of the dry gas seal DGS, such that an axial overlap is possible at least partially between the labyrinth seal LS and components of the dry gas seal DGS. In the concrete example of FIG. 1, the labyrinth seal LS intersects axially with the rotating sealing element RSE of the dry gas seal DGS.

FIG. 2 shows a configuration which is particularly suitable for high-pressure applications, in the case of pressure differences of greater than 200 bar. In this case, the labyrinth sealing surface LSS is on a substantially identical diameter to that of the fourth static seal SS4 between the rotor part RS and the rotating sealing element RSE. The difference between the fifth diameter DSS5 and the fourth diameter DSS4 is less than 10% of the fifth diameter DSS5. Furthermore, in order to minimize the mechanical loads on the sealing elements of the dry gas seal DGS, the difference between the third diameter DSS3 and the fourth diameter DSS4 is less than 10% of the fourth diameter DSS4.

The invention claimed is:

1. A shaft seal insert for a shaft seal of a turbomachine, which extends in an axial direction along an axis of rotation, the shaft seal insert comprising:
- a rotor part which is configured such that it can be mounted on a shaft of a rotor which extends along the axis of rotation,
- a stator part which is configured such that it can be inserted into a stator recess,
- at least one dry gas seal having a rotating sealing element mounted on the rotor part and one static sealing element mounted on the stator part in order to seal an intermediate space between the rotating sealing element and the static sealing element,
- wherein the static sealing element and the rotating sealing element are arranged facing each other on a sealing surface which extends radially and in the circumferential direction, wherein the shaft seal insert has a high-pressure side at one axial end and a low-pressure side at the other axial end,
- wherein a labyrinth seal for sealing the intermediate space is provided on the high-pressure side in a serial arrangement with the dry gas seal, comprising a static labyrinth seal part and a rotating labyrinth seal part, wherein the static labyrinth seal part is either part of, or is securely mounted on, the stator part, and wherein the rotating labyrinth seal part is either part of, or is securely mounted on, the rotor part,
- wherein the labyrinth seal is the axially outermost seal of the shaft seal insert on the high pressure side,
- wherein a middle labyrinth sealing surface, which extends in the circumferential direction and in the axial direction, between the static labyrinth seal part and the rotating labyrinth seal part is arranged coaxially with the axis of rotation at a fifth diameter, wherein the outermost diameter of the sealing surfaces of the dry gas seal is smaller than the fifth diameter.

2. The shaft seal insert as claimed in claim 1, wherein the stator part having a first static seal on a first sealing diameter is configured such that the stator part can be inserted in a sealing manner into the stator recess.

3. The shaft seal insert as claimed in claim 1, wherein a middle labyrinth sealing surface, which extends in the circumferential direction and in the axial direction, between the static labyrinth seal part and the rotating labyrinth seal part is arranged coaxially with the axis of rotation at a fifth diameter, and a fourth static seal is arranged between the static sealing element and the stator part at a fourth diameter,
- wherein the magnitude of the difference between the fourth diameter and the fifth diameter is less than 10% of the fifth diameter.

4. The shaft seal insert as claimed in claim 1, wherein the intermediate space has, between the labyrinth seal and the dry gas seal as seen in the axial direction, a sealing gas supply line for supplying a sealing gas between the labyrinth seal and the dry gas seal, wherein the shaft seal insert has, on the side of the dry gas seal which faces the low-pressure side, a sealing gas evacuation line for evacuating sealing gas which has passed through the dry gas seal.

5. The shaft seal insert as claimed in claim 1, wherein the rotor part having a second static seal at a second sealing diameter is configured such that it can be mounted in a sealing manner on the shaft.

* * * * *